(12) United States Patent
Sato et al.

(10) Patent No.: US 9,247,163 B2
(45) Date of Patent: Jan. 26, 2016

(54) RADIATION IMAGE PICKUP SYSTEM, COMPUTER HAVING RESET OPERATION TO RESET ELECTRIC CHARGE OF PIXELS CAUSED BY DARK CURRENT, AND COMPUTER-READABLE MEDIUM STORING PROGRAM THEREFOR

(71) Applicant: CANON KABUSHIKI KAISHA, Tokyo (JP)

(72) Inventors: Sho Sato, Saitama (JP); Toshio Kameshima, Kumagaya (JP); Tomoyuki Yagi, Honjo (JP); Katsuro Takenaka, Honjo (JP); Hideyuki Okada, Honjo (JP); Atsushi Iwashita, Saitama (JP); Eriko Sato, Tokyo (JP); Takuya Ryu, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/218,635

(22) Filed: Mar. 18, 2014

(65) Prior Publication Data

US 2014/0284491 A1    Sep. 25, 2014

(30) Foreign Application Priority Data

Mar. 21, 2013  (JP) ................................. 2013-058521

(51) Int. Cl.
| | |
|---|---|
| G01T 1/17 | (2006.01) |
| H04N 5/361 | (2011.01) |
| G01T 1/24 | (2006.01) |
| H04N 5/32 | (2006.01) |
| H04N 5/367 | (2011.01) |

(52) U.S. Cl.
CPC ........... *H04N 5/361* (2013.01); *G01T 1/17* (2013.01); *G01T 1/247* (2013.01); *H04N 5/32* (2013.01); *H04N 5/367* (2013.01)

(58) Field of Classification Search
CPC .................................. G01T 1/17; G01T 1/247
See application file for complete search history.

(56) References Cited

U.S. PATENT DOCUMENTS

| | | | | |
|---|---|---|---|---|
| 2011/0069209 | A1* | 3/2011 | Kanemitsu et al. | 348/246 |
| 2011/0134289 | A1* | 6/2011 | Mochizuki et al. | 348/246 |

FOREIGN PATENT DOCUMENTS

JP    2011-249891 A    12/2011

* cited by examiner

*Primary Examiner* — David Porta
*Assistant Examiner* — Faye Boosalis
(74) *Attorney, Agent, or Firm* — Canon USA Inc. IP Division

(57) ABSTRACT

A radiation image pickup system includes a correction coefficient calculation unit that calculates a correction coefficient using pixel output values of a plurality of pixels, and a correction unit that corrects pixel output values of a plurality of pixels using the correction coefficient. A drive control unit repeatedly resets an electric charge caused by a dark current of a plurality of pixels until a detection unit detects a start of radiation exposure. The reset operation is performed simultaneously for n rows that are not adjacent to each other, where n is an integer equal to or greater than 2. The correction coefficient calculation unit calculates the correction coefficient using pixel output values of pixels in a row subjected to the reset operation in a period from a start of radiation exposure to a start detection time and pixel output values of pixels in an adjacent row.

18 Claims, 9 Drawing Sheets

RADIATION IMAGE PICKUP SYSTEM, COMPUTER HAVING RESET OPERATION TO RESET ELECTRIC CHARGE OF PIXELS CAUSED BY DARK CURRENT, AND COMPUTER-READABLE MEDIUM STORING PROGRAM THEREFOR

BACKGROUND OF THE INVENTION

1. Field of the Invention

The present invention relates to a radiation image pickup system used to take a still image in radiography or a moving image in fluoroscopy for use in medical diagnosis.

2. Description of the Related Art

A radiation image pickup apparatus using a flat panel detector (hereinafter referred to as an FPD) produced using a semiconductor material is now widely used as an image pickup apparatus in a medical diagnosis or a nondestructive inspection using X-ray radiation. One of such radiation image pickup apparatuses is a digital image pickup apparatus used to capture a still image in radiography or a fluoroscopic moving image for use in medical diagnosis. In such an image pickup apparatus, an X-ray generation apparatus and an FPD are generally synchronized in operation. However, when the FPD is installed, it is necessary to connect the FPD to the X-ray generation apparatus, which leads to a restriction on a place where the FPD is installed. To handle the above situation, it has been proposed to configure a radiation image pickup apparatus and a radiation image pickup system so as to be capable of detect a start and an end of radiation exposure.

However, in the radiation image pickup apparatus and the radiation image pickup system of the above-described type, there may be a delay between a time at which radiation exposure is actually started and a time at which the start of radiation exposure is detected by the radiation image pickup apparatus. During such a period of delay, there is a possibility that part of a useful electric charge generated in a pixel via a readout process or a reset process is carried to a signal line and thus an artifact occurs in an image.

Japanese Patent Application Laid-Open No. 2011-249891 discloses a technique to prevent such an artifact from appearing successively on a plurality of scanning lines. In the technique disclosed in Japanese Patent Application Laid-Open No. 2011-249891, a reset process is performed until radiation exposure is started such that an on-voltage is sequentially applied to scanning lines other than those adjacent to each other on a detection unit. In a readout process after the radiation exposure is started, an image obtained is processed such that image data on a scanning line having artifact is discarded and replaced by interpolation based image data on adjacent scanning lines thereby repairing the artifact.

In another method, instead of performing the reset process before radiation exposure is started, a readout process is performed, and image data read out after radiation exposure is added to image data obtained in the readout process during radiation exposure is thereby repairing artifact.

However, in the method of repairing artifacts by discarding and replacing image data on a scanning line having an artifact by interpolation based on adjacent image data, diagnosis information on this scanning line is lost and thus a reduction in resolution occurs. Besides, in a case where line noise occurs on adjacent image data, there is a possibility that repairing is not performed correctly.

On the other hand, in the technique in which artifact is repaired by adding image data read out after radiation exposure is performed to image data obtained during the readout process when radiation exposure is performed, two images are added together. Thus in this technique, the addition of two images causes an increase in random noise due to difference in output among pixels by a factor of about $\sqrt{2}$.

SUMMARY OF THE INVENTION

The present invention is directed to a radiation image pickup system capable of detecting a start of radiation exposure and obtaining a high-quality image with suppressed artifact.

According to an aspect of the invention, a radiation image pickup system includes a plurality of pixels arranged in the form of an array and each configured to convert radiation to an electric charge and output a pixel output value corresponding to the resultant electric charge, a detection unit configured to detect a start of radiation exposure, a drive control unit configured to, when the detection unit detects the start of radiation exposure, switch an operation on the plurality of pixels from a reset operation to a charge accumulation operation, a correction coefficient calculation unit configured to calculate a correction coefficient using pixel output values output from the plurality of pixels, and a correction unit configured to correct the pixel output values output from the plurality of pixels using the correction coefficient calculated by the correction coefficient calculation unit, wherein the drive control unit repeatedly performs the reset operation to reset an electric charge caused by a dark current of the plurality of pixels until the detection unit detects the start of radiation exposure, the reset operation is performed simultaneously for n rows that are not adjacent to each other where n is an integer equal to or greater than 2, and the correction coefficient calculation unit calculates the correction coefficient using pixel output values of pixels belonging to a row subjected to the reset operation in a period from a time at which radiation exposure is started to a time at which the detection unit detects the start of radiation exposure and pixel output values of pixels belonging to a row adjacent to the row subjected to the reset operation.

By detecting the start of radiation exposure and performing the correction using the correction coefficient, it is possible to achieve high-quality image with a suppressed artifact.

Further features of the present invention will become apparent from the following description of exemplary embodiments with reference to the attached drawings.

DESCRIPTION OF THE EMBODIMENTS

First Embodiment

Figure 1:
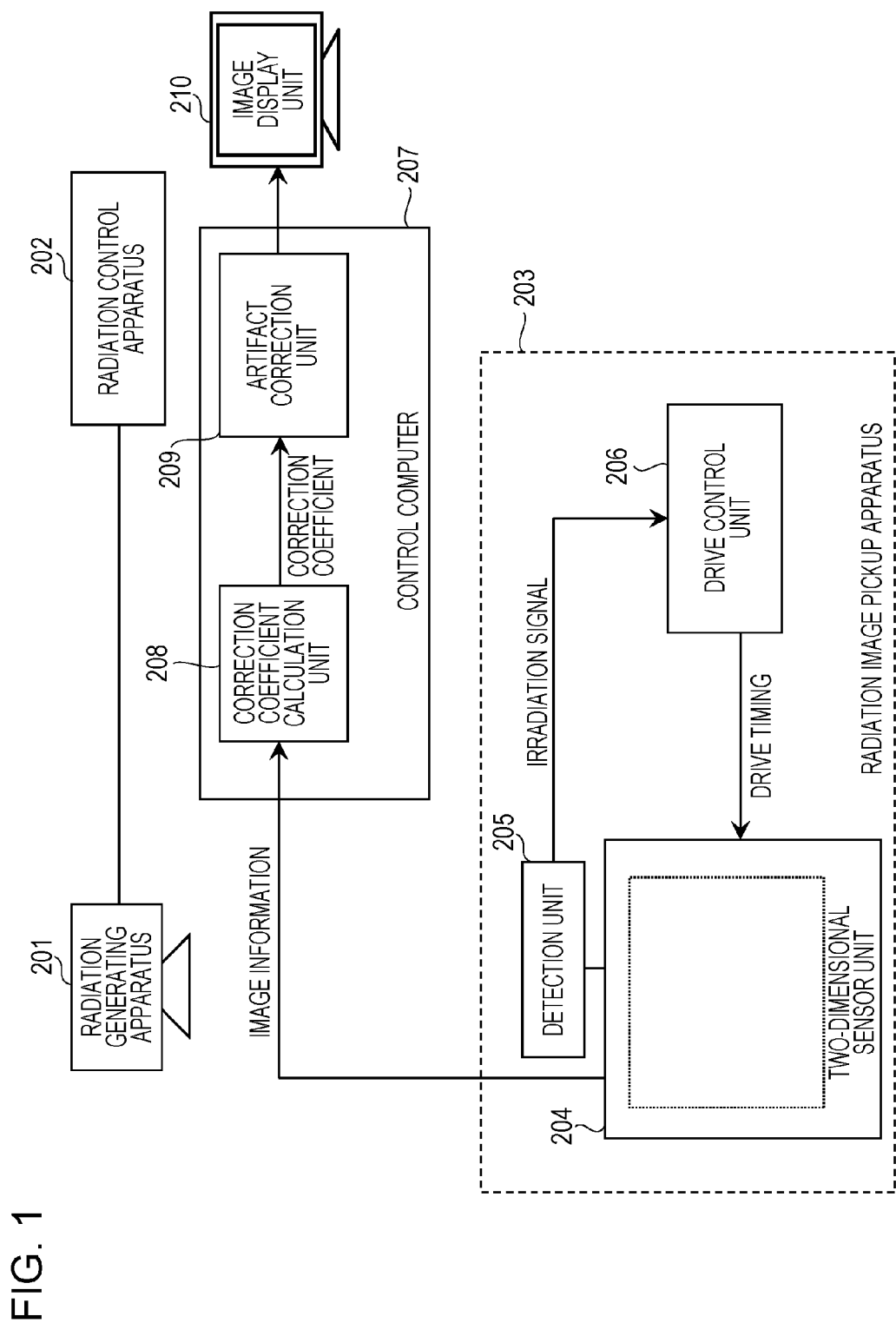
FIG. 1 is a diagram illustrating an example of a configuration of a radiation image pickup system according to a first embodiment.

FIG. 1 is a block diagram illustrating an example of a configuration of radiation image pickup system according to a first embodiment of the invention. The radiation image pickup system includes a radiation generating apparatus 201, a radiation control apparatus 202, a control computer 208, a radiation image pickup apparatus 203, and an image display unit 210. The control computer 207 includes a correction coefficient calculation unit 208 and an artifact correction unit 209. The radiation image pickup apparatus 203 includes a two-dimensional sensor unit 204, a detection unit 205 and a drive control unit 206. Note that the term "radiation" is used to describe various kinds of radiations including a beam of particles (or photons) such as an alpha ray, a beta ray, a gamma ray, etc. radiated via radioactive decay, and other beams with high energy similar to that of such particle beams. For example, an X-ray, a cosmic ray, etc., fall in the scope of radiations.

The radiation generating apparatus 201 emits a radiation under the control of the radiation control apparatus 202. The radiation strikes the radiation image pickup apparatus 203 via an object. The two-dimensional sensor unit 204 generates image information depending on the radiation. The detection unit 205 detects a start and an end of radiation exposure. In response to each detection, the detection unit 205 outputs an irradiation signal to the drive control unit 206. In response to the irradiation signal, the drive control unit 206 outputs a drive timing signal to the two-dimensional sensor unit 204 to control driving of the two-dimensional sensor unit 204. The correction coefficient calculation unit 208 calculates a correction coefficient using the image information acquired from the two-dimensional sensor unit 204 and outputs the calculated correction coefficient to the artifact correction unit 209. Based on the correction coefficient, the artifact correction unit corrects the image information acquired from the two-dimensional sensor unit 204 to reduce the artifact. The image display unit 210 displays the image information corrected by the artifact correction unit 209.

Figure 2:
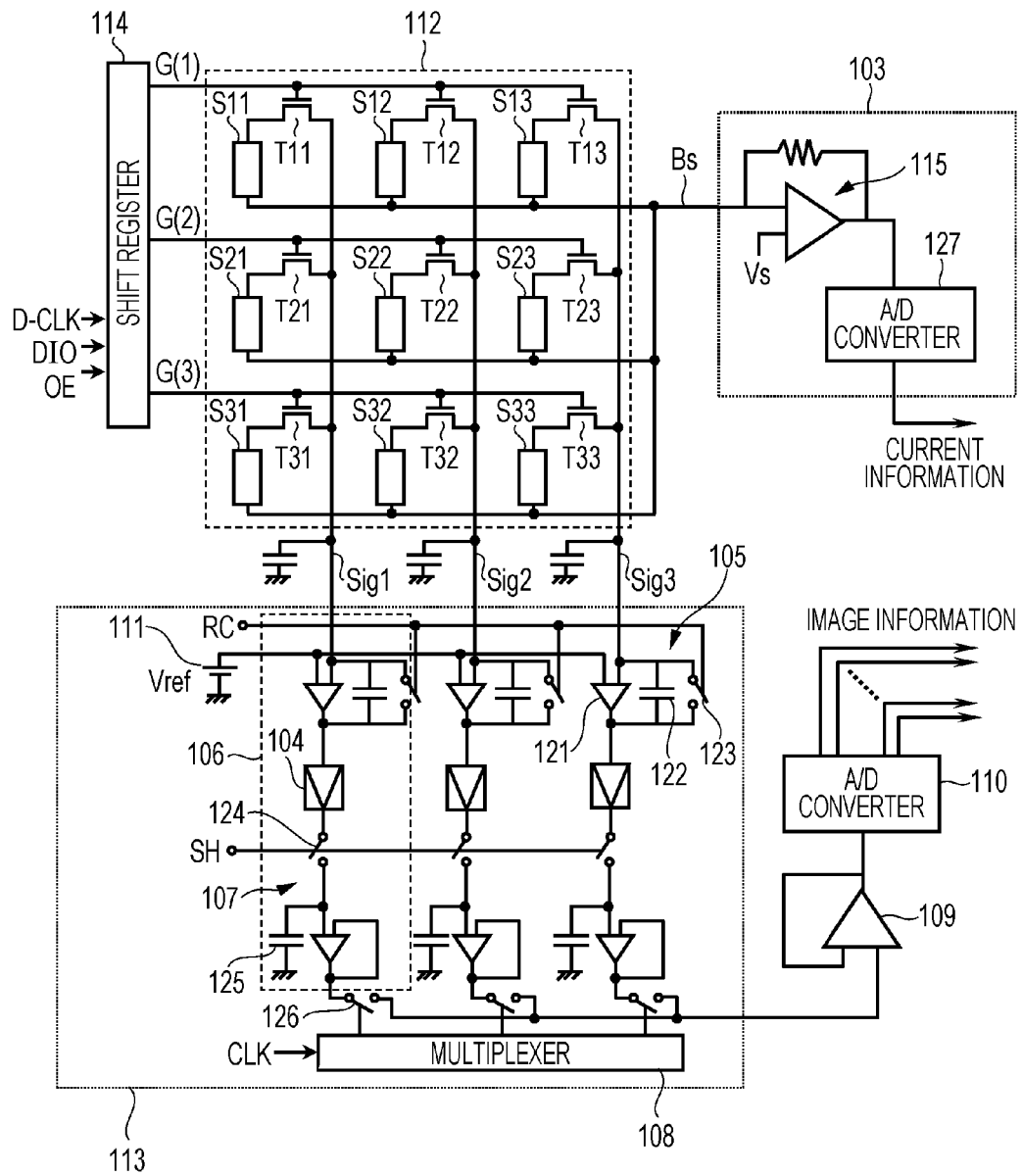
FIG. 2 is a diagram illustrating an example of a configuration of a radiation image pickup apparatus according to the first embodiment.

FIG. 2 is a circuit diagram illustrating an example of a configuration of the two-dimensional sensor unit 204 illustrated in FIG. 1. The two-dimensional sensor unit 204 is a sensor configured such that elements (pixels) that detect radiation are disposed in a two-dimensional array. The two-dimensional sensor unit 204 detects radiation and outputs image information. In the example illustrated in FIG. 2, for simplicity, it is assumed that the detection unit 112 includes pixels arranged in an array with 3 rows and 3 columns. However, practically, the two-dimensional sensor unit 204 may include a greater number of pixels. For example, when the radiation image pickup apparatus 203 is of a 17 inch type, the two-dimensional sensor unit 204 may include pixels arranged in an array with about 2800 rows and about 2800 columns.

The detection unit 112 includes a plurality of pixels disposed in the form of an array as described above. Each pixel includes a conversion element (one of conversion elements S11 to S33 in FIG. 2) configured to convert radiation or light into an electric charge and also include a switch element (one of switch elements T11 to T33 in FIG. 2) configured to output an electric signal corresponding to the electric charge of the conversion element (one of S11 to S33) thereby outputting a pixel output value. Each of the conversion elements S11 to S33 may be a conversion element of an indirect type or a direct type capable of converting incident radiation to an electric charge. In the case where the conversion elements S11 to S33 are of the indirect type, each conversion element includes a wavelength conversion element that converts radiation into light and a photoelectric conversion element that converts the light to an electric charge. In the case where the conversion elements S11 to S33 are of the direct type, each conversion element is capable of directly converting radiation into an electric charge. The photoelectric conversion element for converting incident light into an electric charge may be a MIS-type photodiode made of amorphous silicon as a main material disposed on an insulating substrate such as a glass substrate. Alternatively, the photoelectric conversion element may be a PIN-type photodiode.

Each of the switch elements T11 to T33 may be a transistor having a control terminal and two main terminals. More specifically, each switch element may be a thin film transistor (TFT). One electrode of each of the conversion elements S11 to S33 is electrically connected to one of the two main terminals of corresponding one of the switch elements T11 to T33, and the other electrode of each conversion element is electrically connected to a bias power supply unit 103 via a common bias line Bs. The control terminal of each of a plurality of switch elements T11 to T13 in a first row is electrically connected in common to a driving line G(1) in the first row. The control terminal of each of a plurality of switch elements T21 to T23 in a second row is electrically connected in common to a driving line G(2) in the second row. The control terminal of each of a plurality of switch elements T31 to T33 in a third row is electrically connected in common to a driving line G(3) in the third row. The vertical driving circuit 114 may be, for example, a shift register. The vertical driving circuit 114 provides a driving signal to the switch elements T11 to T33 via the driving lines G(1) to G(3) to control the on-state of the switch elements T11 to T33 on a row-by-row basis.

One main terminal of each of a plurality of switch elements T11 to T31 in a first column are electrically connected to corresponding one of the conversion elements S11 to S31, and the other main terminal is electrically connected to a signal line Sig1 in the first column. During a period in which the switch elements T11 to T31 in the first column are in the on-state, electric signals depending on the electric charges of the conversion elements S11 to S31 in the first column are output to a reading circuit 113 via the signal line Sig1. One main terminal of each of a plurality of switch elements T12 to T32 in a second column is electrically connected to corresponding one of the conversion elements S12 to S32, and the other main terminal is electrically connected to the signal line Sig2 in the second column. During a period in which the switch elements T12 to T32 in the second column are in the on-state, electric signals corresponding to the electric charges of the conversion elements S12 to S32 in the second column are output to the reading circuit 113 via the signal line Sig2. One main terminal of each of a plurality of switch elements T13 to T33 is electrically connected to corresponding one of conversion elements S13 to S33, and the other main terminal is electrically connected to a signal line Sig3 in the third column. During a period in which the switch elements T13 to T33 in the third column are in the on-state, electric signals corresponding to electric charges of conversion elements S13 to S33 in the third column are output to the reading circuit 113 via the signal line Sig3. The plurality of signal lines Sig1 to Sig3 extending in the column direction read out, in parallel, the electric signals from a plurality of pixels and output them to the reading circuit 113.

The reading circuit 113 includes amplifier circuits 106 provided for respective signal lines Sig1 to Sig3 to amplify the electric signals supplied via the respective signal lines Sig1 to Sig3. Each amplifier circuit 106 includes an integrating amplifier 105, a variable gain amplifier 104, and a sample-and-hold circuit 107. The integrating amplifier 105 amplifies the electric signal supplied via corresponding one of the signal lines Sig1 to Sig3. The variable gain amplifier 104 performs a variable-gain amplification on the electric signal supplied from the integrating amplifier 105. The sample-and-hold circuit 107 samples and holds the electric signal amplified by the variable gain amplifier 104. Each integrating amplifier 105 includes an operational amplifier 121 configured to amplify the electric signal supplied via corresponding one of the signal lines Sig1 to Sig3, an integrating capacitor 122, and a reset switch 123. The integrating amplifier 105 is capable of changing a gain by changing the value of the integrating capacitor 122. An inverting input terminal of the operational amplifier 121 in each column is connected to corresponding one of the signal lines Sig1 to Sig3 and a non-inverting input terminal of each operational amplifier 121 is connected to a reference power supply unit 111 with a reference voltage Vref. An electric signal amplified by each operational amplifier 121 is output from its output terminal. The reference power supply unit 111 supplies the reference voltage Vref to the non-inverting input terminal of each operational amplifier 121. The integrating capacitor 122 is disposed between the inverting input terminal and the output terminal of the operational amplifier 121. The sample-and-hold circuit 107 includes a sampling switch 124 connected to a control signal SH and a sampling capacitor 125. The readout circuit 113 also includes switches 126 disposed in respective columns and a multiplexer 108. The multiplexer 108 sequentially turns on the switches 126 in the respective columns such that the electric signals supplied in parallel from the respective amplifier circuits 106 are sequentially output as a serial signal to the output buffer amplifier 109. The output buffer amplifier 109 performs an impedance conversion on the electric signal and outputs the resultant electric signal. An analog-to-digital (A/D) converter 110 converts the analog electric signal output from the output buffer amplifier 109 into a digital electric signal and outputs the resultant digital electric signal as image information to the control computer 207 illustrated in FIG. 1.

The bias power supply unit 103 includes a current-voltage conversion circuit 115 and an analog-to-digital converter 127. While the current-voltage conversion circuit 115 supplies the bias voltage Vs to the bias line Bs, the current-voltage conversion circuit 115 converts a current flowing through the bias line Bs into a voltage and outputs the resultant voltage to the analog-to-digital converter 127. The analog-to-digital converter 127 converts the analog voltage value indicating current information into a digital voltage value indicating current information and outputs the resultant digital voltage value. The detection unit 205 illustrated in FIG. 1 detects a start and an end of radiation exposure based on the current information output from the analog-to-digital converter 127.

In accordance with control signals D-CLK, OE, and DIO supplied from the drive control unit 206 illustrated in FIG. 1, the vertical driving circuit 114 outputs driving signals with an on-voltage or an off-voltage to the respective driving lines G(1) to G(3) to turn on or off the switch elements T11 to T33. Thus, the vertical driving circuit 114 controls the on-state and the off-state of the switch elements T11 to T33 thereby driving the detection unit 112. The control signal D-CLK is a shift clock of a shift register used as the vertical driving circuit 114. The control signal DIO is a transfer pulse of the shift register of the vertical driving circuit 114. The control signal OE is an output enable signal of the shift register of the vertical driving circuit 114. The vertical driving circuit 114 sets a driving time and a scanning direction by using the control signals described above. The drive control unit 206 controls operations of respective constituent elements of the readout circuit 113 by outputting a control signal RC, a control signal SH, and a control signal CLK to the readout circuit 113. The control signal RC is a signal for controlling an operation of the reset switch 123 of the integrating amplifier 105. The control signal SH is a signal for controlling the sampling switch 124 of the sample-and-hold circuit 107. The control signal CLK is a clock signal for controlling an operation of the multiplexer 108.

Figure 3:
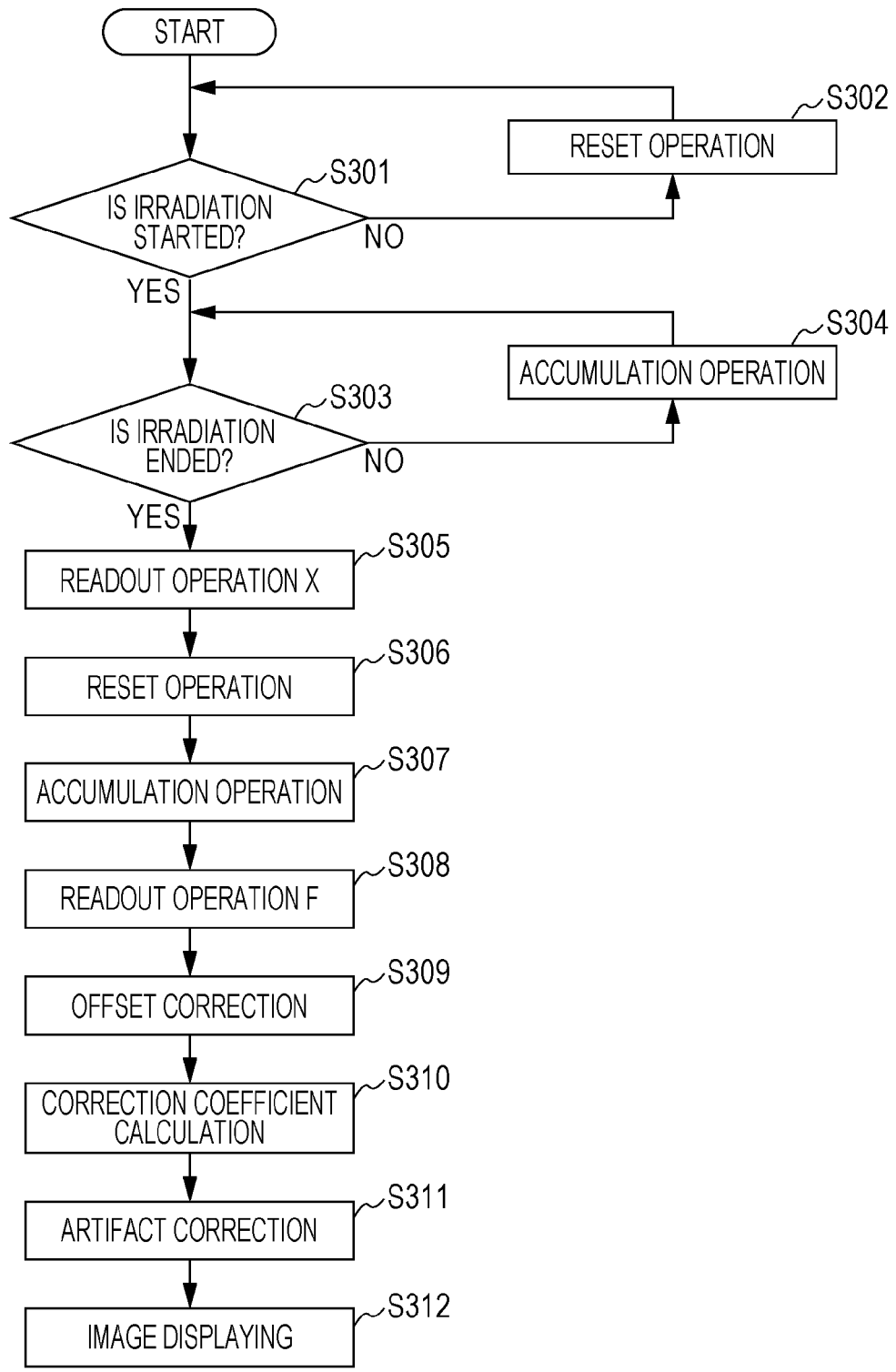
FIG. 3 is a flow chart illustrating a control method according to the first embodiment.

FIG. 3 is a flow chart illustrating a method of controlling the radiation image pickup system illustrated in FIG. 1. In step S301, the drive control unit 206 determines whether or not radiation exposure has been started. In a case where the detection unit 205 detects that the current information (an electric signal depending on incident radiation) output from the analog-to-digital converter 127 is equal to or greater than a threshold value, the detection unit 205 outputs an irradiation signal indicating that the radiation exposure has been started to the drive control unit 206. In a case where the irradiation signal is input to the drive control unit 206, the drive control unit 206 determines that the radiation exposure has been started, but in a case where the irradiation signal is not input, the drive control unit 206 determines that the radiation exposure has not been started. In the case where the radiation exposure has been started, the processing flow proceeds to step S303. In the case where the radiation exposure has not been started, the processing flow proceeds to step S302. In step S302, under the control of the drive control unit 206, the two-dimensional sensor unit 204 performs a reset operation. Thereafter, the processing flow returns to step S301. The two-dimensional sensor unit 204 repeatedly performs the reset operation in which an electric charge generated by a dark current in a pixel is reset before each radiation exposure. The reset operation is performed starting from pixels in the first row until pixels in the last row (Y-th row) are reset. After the pixels in the last row are reset, the reset operation returns to the pixels in the first row. The reset operation will be described in further detail later with reference to FIG. 4.

In step S303, the drive control unit 206 determines whether the radiation exposure has been ended. In a case where the detection unit 205 detects that the current information (the electric signal depending on the incident radiation) output from the analog-to-digital converter 127 is smaller than a threshold value, the detection unit 205 stops outputting the irradiation signal. In a case where the inputting of the irradiation signal to the drive control unit 206 is stopped, the drive-and-control unit 206 determines that the radiation exposure has been ended. On the other hand, in a case where the inputting of the irradiation signal to the drive control unit 206 is continuing, the drive-and-control unit 206 determines that the radiation exposure has not been ended. In a case where the radiation exposure has been ended, the processing flow proceeds to step S305. On the other hand, when the radiation exposure has not been ended, the processing flow proceeds to step S304. Thereafter, the processing flow returns to step S303. The charge accumulation operation is an operation in which the switch elements T11 to T33 of all pixels are turned off, and an electric charge generated by radiation exposure is accumulated in each pixel. The charge accumulation operation is performed until the radiation exposure is ended.

In step S305, under the control of the drive control unit 206, the two-dimensional sensor unit 204 performs a readout operation X to read out an electric charge depending on radiation exposure. In the readout operation X, the switch elements S11 to S33 are turned on in units of rows so that electric signals are output to the signal lines Sig1 to Sig3 sequentially in units of rows from pixels of the first row to pixels of the last row, and the analog-to-digital converter 110 output image information of pixels from the first row to the last row.

Next, in step S306, under the control of the drive control unit 206, the two-dimensional sensor unit 204 performs the reset operation. Next, in step S307, under the control of the drive control unit 206, the two-dimensional sensor unit 204 performs a charge accumulation operation. Note that in this accumulation operation, radiation exposure is not performed, and thus electric charges caused by dark currents are accumulated in the conversion elements S11 to S33. The operation of accumulating the electric charges due to the dark currents is performed for a period with the same length as that of the operation in step S304 in which electric charges depending on the radiation exposure are accumulated.

Next, in step S308, under the control of the drive control unit 206, the two-dimensional sensor unit 204 performs a readout operation F to read out the electric charges originating from the dark currents. In the readout operation F, the switch elements S11 to S33 are turned on in units of rows so that electric signals are output to the signal lines Sig1 to Sig3 sequentially in units of rows from pixels of the first row to pixels of the last row. The analog-to-digital converter 110 outputs image information (dark current information) of pixels from the first row to the last row.

Next, in step S309, the control computer 207 performs the reset operation. More specifically, the control computer 207 performs the offset correction by calculating the difference between the image information obtained as a result of the readout operation X in step S305 and the image information obtained as a result of the readout operation F in step S308. That is, the offset is corrected by subtracting the dark current component from the image of the radiation exposure.

Next, in step S310, the correction coefficient calculation unit 208 calculates a correction coefficient using the image information with the corrected offset. Next, in step S311, the artifact correction unit 209 corrects an artifact by using the correction coefficient calculated by the correction coefficient calculation unit 208. Next, in step S312, the image display unit 210 displays an image according to the image information corrected by the artifact correction unit 209.

Figure 4:
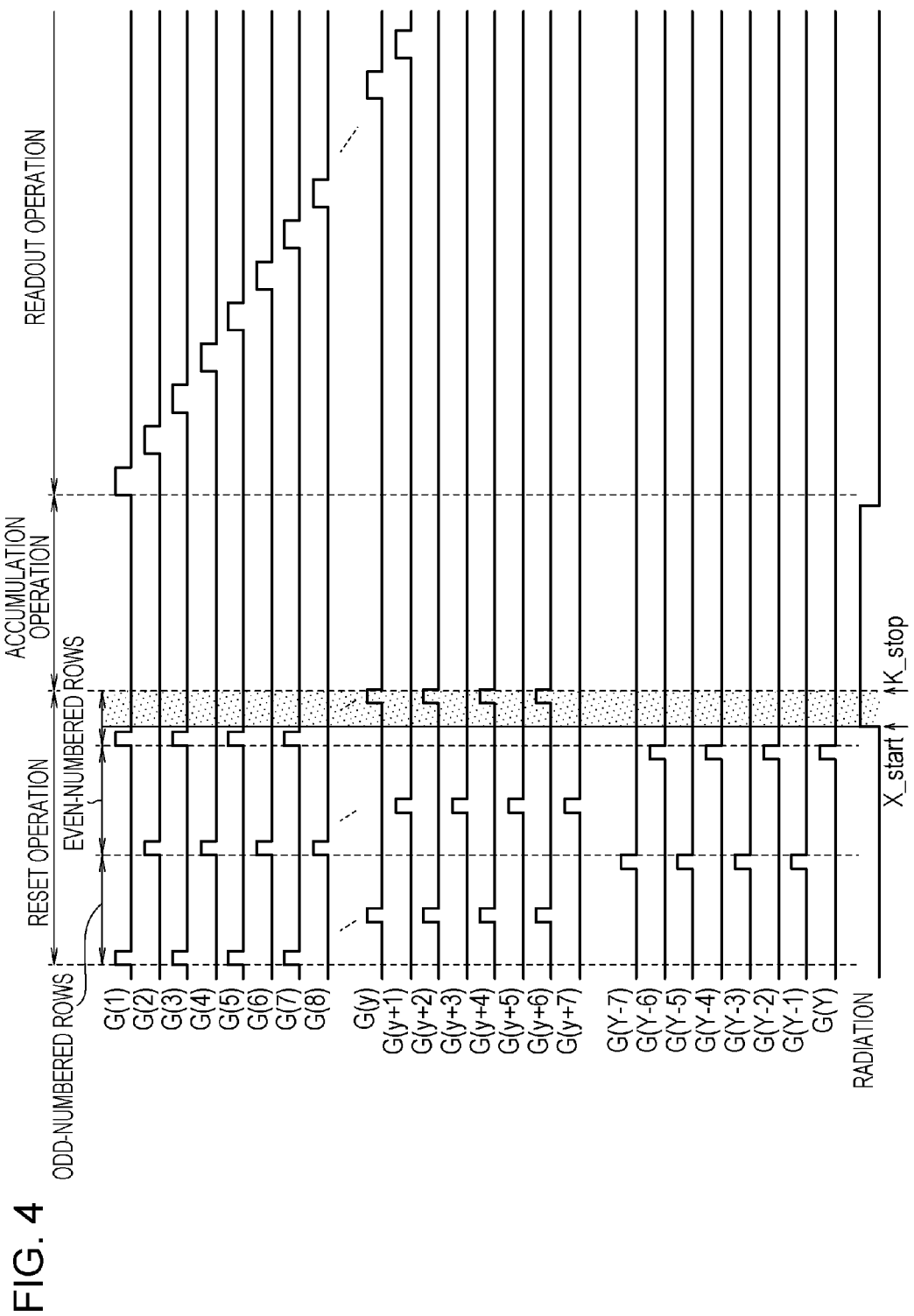
FIG. 4 is a diagram illustrating an example of a driving method according to the first embodiment.

FIG. 4 is a flow chart illustrating a method of driving the radiation image pickup apparatus 203. In FIG. 4, driving signals given via driving lines G(1) to G(Y) and a control signal for controlling radiation are illustrated. As illustrated in FIG. 2, the driving line G(1) is a driving line for driving pixels in the first row, and the driving line G(Y) is a driving line for driving pixels in the Y-th row (last row). The radiation generating apparatus 201 emits radiation when the radiation control signal is at a high level, but the radiation generating apparatus 201 does not emit radiation when the radiation control signal is at a low level.

First, as described above with reference to step S302 in FIG. 3, the two-dimensional sensor unit 204 performs the reset operation repeatedly until the radiation exposure is started. The reset operation is performed separately for odd-numbered and even-numbered rows of the switch elements T11 to T33 such that a plurality of rows are simultaneously turned on. In the example illustrated in FIG. 4, four rows are simultaneously turned on.

First, driving signals of four driving lines G(1), G(3), G(5), and G(7) in the odd-numbered rows are turned to an on-voltage thereby turning on switch elements T11, T31 and the like corresponding to the driving lines G(1), G(3), G(5), and G(7) in the odd-numbered rows. Next, driving signals of four driving lines G(9), G(11), G(13), and G(15) in the odd-numbered rows are turned to an on-voltage thereby turning on switch elements T91 and the like corresponding to the driving lines G(9), G(11), G(13), and G(15) in the odd-numbered rows. Similarly, the reset operation is performed repeatedly until the reset operation is complete for a driving line G(Y−1) in the last odd-numbered row.

Thereafter, driving signals of four driving lines G(2), G(4), G(6), and G(8) in even-numbered rows are turned to an on-voltage thereby turning on switch elements T21, T41 and the like corresponding to the driving lines G(2), G(4), G(6), and G(8) in the even-numbered rows. Next, driving signals of four driving lines G(10), G(12), G(14), and G(16) in even-numbered rows are turned to an on-voltage thereby turning on switch elements corresponding to the driving lines G(10), G(12), G(14), and G(16) in the even-numbered rows. Similarly, the reset operation is performed repeatedly until the reset operation is complete for a driving line G(Y) in the last even-numbered row.

When the radiation generating apparatus 201 starts radiation exposure and thus the detection unit 205 detects the start of radiation exposure, the two-dimensional sensor unit 204 stops the reset operation and starts the accumulation operation in step S304 under the control of the drive control unit 206. More specifically, when the detection unit 205 detects a start of radiation exposure at time K_stop, the drive control unit 206 switches the operation on plurality of pixels from the reset operation to the charge accumulation operation. Although in the example illustrated in FIG. 2, the detection unit 205 detects whether or not radiation exposure is performed based on information of the bias current flowing through the bias line Bs, a dedicated sensor may be provided separately for detecting radiation exposure. In the accumulation operation, the driving signals of the driving lines G(1) to G(Y) are turned to an off-voltage thereby turning off all switch elements T11 and the like to allow electric charges to be accumulated in the respective conversion elements S11 and the like depending on the radiation.

Thereafter, the readout operation X is performed in step S305. In the readout operation, the driving lines G(1) to G(Y) are sequentially turned to the on-voltage thereby turning on the switch elements T11 and the like in units of rows. Thus, image information of each row is output.

When the above-described driving is performed, the reset operation is performed during a period from a start time X_start at which radiation exposure is started by the radiation generating apparatus 201 to a detection time K_stop at which the start of the radiation exposure is detected by the detection unit 205. In pixels connected to the driving lines G(y), G(y+2), G(y+4), and G(y+6) that are reset during this period, a loss of part of electric charge corresponding to the radiation exposure may occur, which may cause the image to have an artifact.

Figure 5:
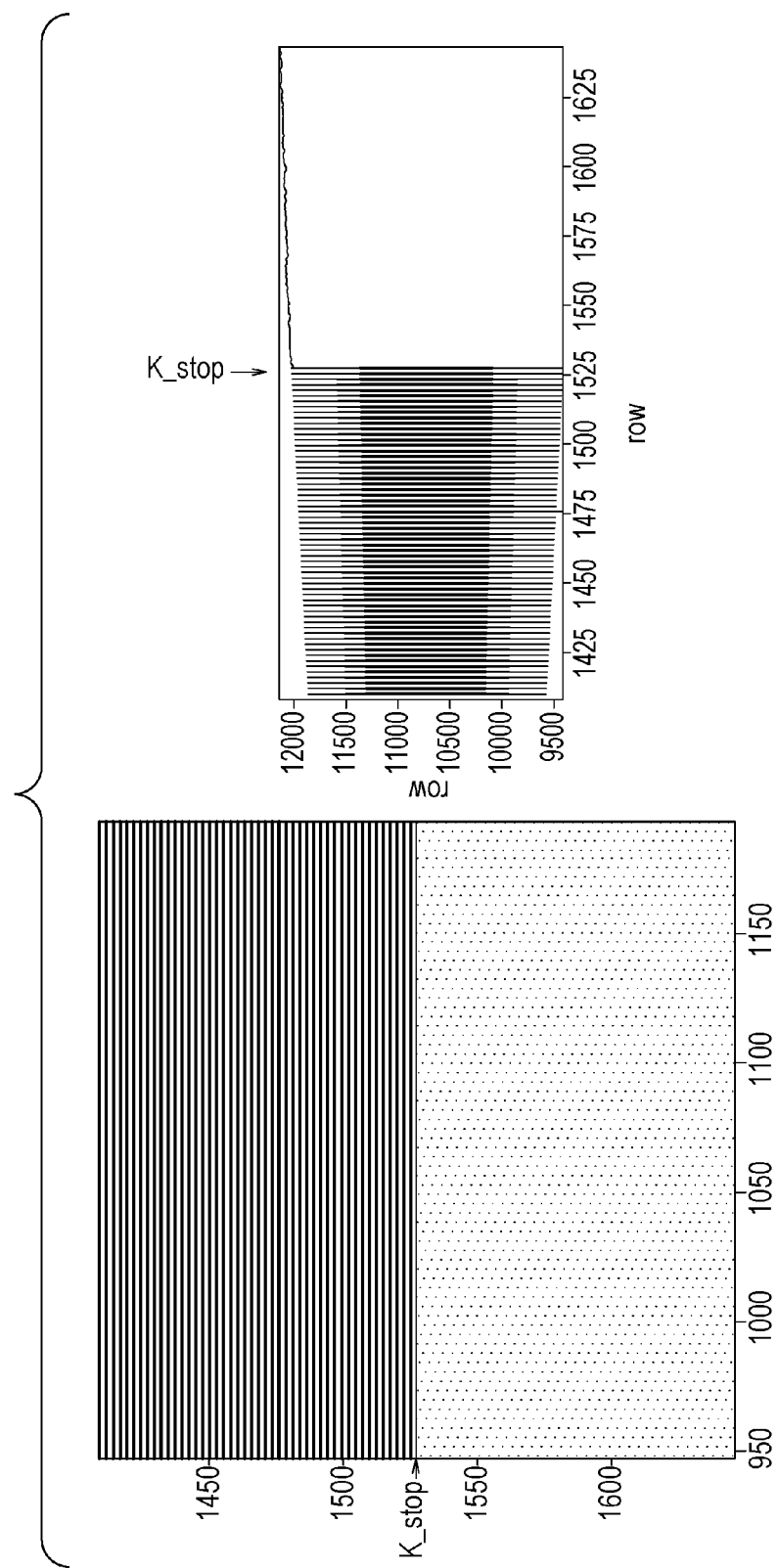
FIG. 5 is a diagram illustrating a problem to be handled by the first embodiment.

FIG. 5 illustrates an example of an artifact in an image produced during the driving process illustrated in FIG. 4. In pixels in odd-numbered rows that are reset during the period from the radiation exposure start time X_start to the radiation exposure start detection time K_stop, a reduction in output occurs, which causes a horizontal line artifact to appear.

The reset operation illustrated in FIG. 4 has two benefits described below. Firstly, a row adjacent to each row with artifact is a normal row in which no artifact occurs (no reduction in output occurs), and thus it is possible to calculate a correction coefficient using the adjacent row that provides similar image information to that provided by the row with artifact. Secondly, because switch elements in a plurality of rows are simultaneously turned on, artifact is similar in amount among the pixels of the plurality of rows turned on simultaneously.

Figure 6A:
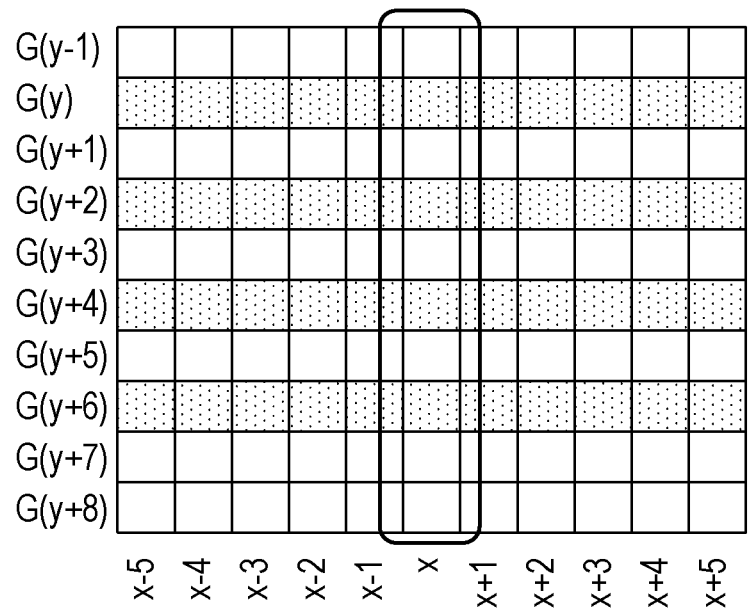
FIGS. 6A and 6B are diagrams illustrating a method of calculating a correction coefficient according to the first embodiment.
Figure 6B:
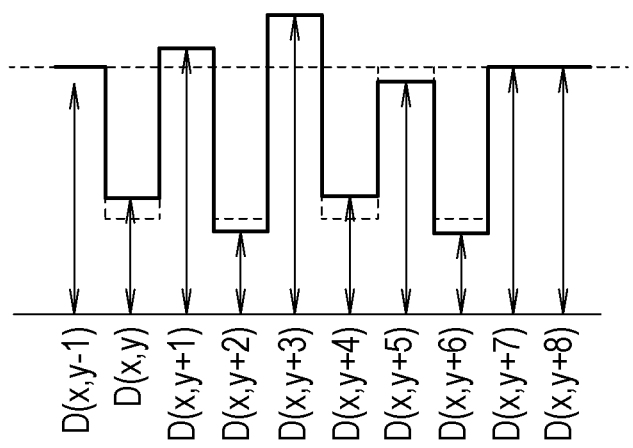

Referring to FIGS. 6A and 6B, a method of correcting an artifact is described below. FIG. 6A conceptually illustrates pixels having an artifact. For example, in pixels in the y-th row (y+2)th row, (y+4)th row, and the (y+6)th row, the electric charge generated by the radiation exposure is partially lost during the reset operation, and thus artifact occurs in these pixels. FIG. 6B illustrates output values of pixels in an x-th column in FIG. 6A. In FIG. 6B, D(x, y) denotes an output value of a pixel located in the x-th column and in the y-th row. In pixels in the y-th row, (y+2)th row, (y+4)th row, and (y+6)th row, output values are lower than those of adjacent pixels, that is, artifacts occur.

Next, a method of calculating a correction coefficient by the correction coefficient calculation unit 208 is described below. When the output value D(x, y) is simply linearly interpolated by output values of pixels in adjacent rows, a corrected output value D'(x, y) is given by equation (1) described below.

$$D'(x,y)=\{D(x,y-1)+D(x,y+1)\}/2 \quad (1)$$

Equation (1) indicating the simple linear interpolation based on output values of pixels in the adjacent rows does not include an original output value D(x, y). That is, the original output value D(x, y) is discarded and the image information associated with the output value D(x, y) is lost, which results in a reduction in resolution. Furthermore, in a case where line noise is superimposed on an adjacent line, that is, the (y−1)th row or the (y+1)th row, the line noise may cause an increase in correction error, which may cause the corrected output value D'(x, y) to be far from the true value.

To handle the above situation, the correction coefficient calculation unit 208 first calculates an interpolation coefficient a(x, y) using an output value of a pixel in the x column and the y row and output values of pixels in adjacent rows according to equation (2) described below.

$$a(x,y)=\{D(x,y-1)+D(x,y+1)\}/\{2 \times D(x,y)\} \quad (2)$$

In equation (2), the pixel output value D(x, y) is a pixel output value of a pixel in a row that is subjected to the reset operation during the period from the radiation exposure start time X_start to the radiation exposure start detection time K_stop. On the other hand, the pixel output value D(x, y−1) and pixel output value D(x, y+1) are output values of pixels in rows adjacent to the row that is subjected to the reset operation during the period from the radiation exposure start time X_start to the radiation exposure start detection time K_stop.

Similarly, the correction coefficient calculation unit 208 calculates interpolation coefficients a(x, y+2), a(x, y+4), and a(x, y+6) using output values of pixels in the x-th column and the (y+2)th row, the x-th column and the (y+4)th row, and the x-th column and the (y+6)th row and output values of pixels in rows adjacent thereto. The correction coefficient calculation unit 208 then calculates the mean value of the four interpolation coefficients, and employs the calculated mean value as a correction coefficient A(x, y) for use in the artifact correction.

That is, the correction coefficient calculation unit 208 calculates the correction coefficient A(x, y) for use in the artifact correction according to equation (3) described below in which n denotes the number of rows to be simultaneously subjected to the reset operation. More specifically, for example, n may be 4. The reset operation is performed simultaneously for n rows that are at every other locations where n is an integer equal to or greater than 2.

$$A(x,y)=\{\Sigma\{D(x,y+2\times n-3)+D(x,y+2\times n-1)\}/\{2\times D(x,y+2\times n-2)\}\}/n \quad (3)$$

In equation (3), the correction coefficient A(x, y) is given by the summation Σ of n from 1 to 4. The pixel output value D(x, y+2×n−2) is a pixel output value of a pixel in one of n rows simultaneously subjected to the reset operation. Pixel output values D(x, y+2×n−3) and D(x, y+2×n−1) are pixel output values of pixels in rows adjacent to the one of n rows simultaneously subjected to the reset operation. The correction coefficient calculation unit 208 calculates a correction coefficient A(x, y) using the pixel output values of the pixels in n rows simultaneously subjected to the reset operation and the pixel output values of pixels in rows respectively adjacent to the n rows simultaneously subjected to the reset operation.

The correction coefficient A(x, y) is calculated using as many interpolation coefficients (a(x, y) and the like) as the number of rows n simultaneously turned on in the reset operation. This makes it possible to improve accuracy of the correction coefficient A(x, y). The amount of artifact caused by a loss of part of the electric charge generated by the radiation exposure depends on a time period from a start time X_start at which radiation exposure is started to a time at which corresponding one switch element (T11 or the like) turns from the on-state to the off-state. This means that the amount of artifact of image information is substantially equal for n rows (y-th row, (y+2)th row, . . . , (y+2×n−2)th row) simultaneously subjected to the reset operation. Therefore, each plurality of rows simultaneously turned on in the reset operation is grouped into one block, and the correction coefficient A(x, y) is calculated for the block. Using the correction coefficient A(x, y), image information is corrected for n rows (y-th row, (y+2)th row, . . . , (y+2×n−2)to row). Because the correction coefficient A(x, y) is given by the mean value of n interpolation coefficients a(x, y), a(x, y+2), . . . , a(x, y+2×n−2), use of the correction coefficient makes it possible to reduce the effect of line noise.

Next, the artifact correction unit 209 performs the artifact correction using the correction coefficient A(x, y) calculated by the correction coefficient calculation unit 208 according to equation (3), and the artifact correction unit 209 outputs the corrected output value D'(x, y). The method of correcting artifact is described in further detail below.

In the reset operation, as illustrated in FIG. 4 and FIGS. 6A and 6B, switch elements in four rows are simultaneously turned on. The image information of the four rows (y-th row, (y+2)th row, (y+4)th row, and (y+6)th row) simultaneously subjected to the reset operation is corrected using the correction coefficient A(x, y) calculated according to equation (3) for n=4.

The artifact correction unit 209 calculates the product of the pixel output value D(x, y) in the x-th column and the y-th row and the correction coefficient A(x, y) according to equation (4) described below thereby determining the output value D'(x, y) with the corrected artifact for the pixel in the x-th column and the y-th row.

$$D'(x,y)=D(x,y)\times A(x,y) \quad (4)$$

Furthermore, the artifact correction unit 209 calculates the product of the pixel output value D(x, y+2) in the x-th column and the (y+2)th row and the correction coefficient A(x, y) according to equation (5) described below thereby determining the output value D'(x, y+2) with the corrected artifact for the pixel in the x-th column and the (y+2)th row.

$$D'(x,y+2)=D(x,y+2)\times A(x,y) \quad (5)$$

The artifact correction unit 209 calculates the product of the pixel output value D(x, y+4) in the x-th column and the (y+4)th row and the correction coefficient A(x, y) according to equation (6) described below thereby determining the output value D'(x, y+4) with the corrected artifact for the pixel in the x-th column and the (y+4)th row.

$$D'(x,y+4)=D(x,y+4)\times A(x,y) \quad (6)$$

Furthermore, the artifact correction unit 209 calculates the product of the pixel output value D(x, y+6) in the x-th column and the (y+6)th row and the correction coefficient A(x, y) according to equation (7) described below thereby determining the output value D'(x, y+6) with the corrected artifact for the pixel in the x-th column and the (y+6)th row.

$$D'(x,y+6)=D(x,y+6)\times A(x,y) \quad (7)$$

Two advantageous effects described below are provided by correcting the pixel output values D(x, y) and the like in the four rows (y-th row, (y+2)th row, (y+4)th row, and (y+6)th row) simultaneously subjected to the reset operation according to equations (4) to (7) described above. Firstly, use of the original pixel output value D(x, y) makes it possible to correct artifact without losing the image information. Secondary, use of the correction coefficient A(x, y) calculated according to equation (3) makes it possible to correct artifact without being significantly influenced by line noise.

Regarding the second advantageous effect, by increasing the number of rows n simultaneously turned on in the reset operation, it is possible to increase the noise reduction effect achieved by averaging. In the case where the start of radiation exposure is detected by the detection unit 205 based on information of the bias current flowing through the bias line Bs as described above, the detection sensitivity increases with the number of rows n simultaneously turned on in the reset operation. However, on the other hand, the increase in the number of rows n simultaneously turned on in the reset operation results in an increase in switching noise that occurs when the switch element T11 or the like is switched between the on-state and the off-state, which may exert an adverse influence on image quality or the bias current detection. In view of the above, the number of rows n simultaneously turned on in the reset operation may be set to 4 as employed in the present embodiment or to a similar value. In the present embodiment, as described above with reference to FIG. 4, the reset operation is performed simultaneously for n rows at every other locations where n is an integer equal to or greater than 2. However, the manner of the reset operation is not limited to that described above as long as the reset operation is performed simultaneously for n rows that are not directly adjacent to each other. For example, the odd-numbered rows and the even-numbered rows are respectively divided into two groups, and the reset operation may be performed simultaneously for n rows in each group.

Second Embodiment

Figure 7A:
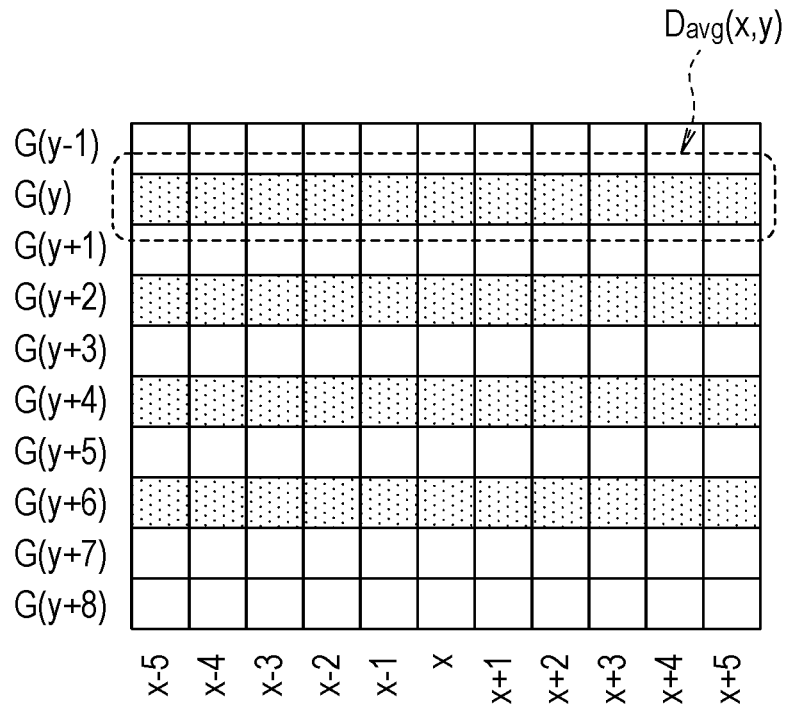
FIGS. 7A and 7B are diagrams illustrating a method of calculating a correction coefficient according to a second embodiment.
Figure 7B:
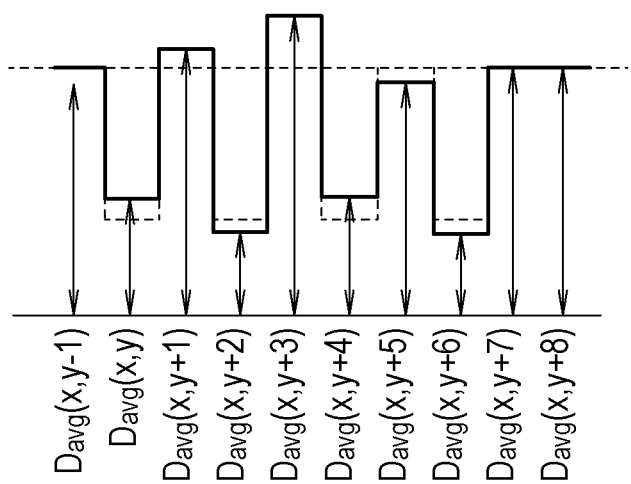

Referring to FIGS. 7A and 7B, a method of correcting artifact according to a second embodiment is described below. Note that FIGS. 7A and 7B respectively correspond to FIGS. 6A and 6B. In the following description of the second embodiment, focus is placed on differences from the first embodiment.

In the calculation of the correction coefficient A(x, y) according to the first embodiment described above, the interpolation coefficient a(x, y) is first calculated using the pixel output value D(x, y) in the x-th column and the y-th row and the pixel output values in the adjacent rows. In the second embodiment, the correction coefficient calculation unit 208 calculates an output value $D_{avg}(x, y)$ by averaging pixel output values in a y-th row over an arbitrary range in the row direction. Similarly, the correction coefficient calculation unit 208 calculates an output value $D_{avg}(x, y-1)$ by averaging pixel output values in a (y-1)th row over an arbitrary range in the row direction, and an output value $D_{avg}(x, y+1)$ by averaging pixel output values in a (y+1)th row over an arbitrary range in the row direction. Next, the correction coefficient calculation unit 208 calculates an interpolation coefficient $a_{avg}(x, y)$ in the y-th row using the average pixel output values $D_{avg}(x, y-1)$, $D_{avg}(x, y)$ and $D_{avg}(x, y+1)$ in the (y-1)th row, y-th row, and (y+1)th row, respectively, according to equation (8) described below.

$$a_{avg}(x,y)=\{D_{avg}(x,y-1)+D_{avg}(x,y+1)\}/\{2\times D_{avg}(x,y)\} \quad (8)$$

In a similar manner, the correction coefficient calculation unit 208 calculates interpolation coefficients $a_{avg}(x, y+2), \ldots, a_{avg}(x, y+2\times n-2)$ using pixel output values in the x-th column and the (y+2)th row, ..., x-th column and (y+2×n-2)th row and pixel output values in adjacent rows. The correction coefficient calculation unit 208 then calculates the mean value of the n interpolation coefficients $a_{avg}(x, y+2), \ldots, a_{avg}(x, y+2\times n-2)$, and the correction coefficient calculation unit 208 employs the calculated mean value as the correction coefficient for use in the artifact correction. In equation (8), by using the output value $D_{avg}(x, y)$ obtained by averaging pixel output values in the y-th row over an arbitrary range in the row direction, it is possible to average random noise over pixels and thus it is possible to improve correction accuracy.

As described above, the correction coefficient calculation unit 208 calculates the correction coefficient $A_{avg}(x, y)$ in the x-th column and the y-th row using the average pixel output values $D_{avg}(x, y-1)$, $D_{avg}(x, y)$ and $D_{avg}(x, y+1)$ in the (y-1)th row, y-th row, and (y+1)th row, respectively, according to equation (9) described below where n denotes the number of rows simultaneously turned on in the reset operation.

$$A_{avg}(x,y)=\{\Sigma\{D_{avg}(x,y+2\times n-3)+D_{avg}(x,y+2\times n-1)\}/\{2\times D_{avg}(x,y+2\times n-2)\}\}/n \quad (9)$$

In equation (9), the correction coefficient $A_{avg}(x, y)$ is given by the summation Σ of n from 1 to 4. The average value $D_{avg}(x, y+2\times n-2)$ is the average value of pixel output values of a plurality of pixels in a row subjected to the reset operation. The average values $D_{avg}(x, y+2\times n-3)$ and $D_{avg}(x, y+2\times n-1)$ are average values of pixel output values of a plurality of pixels in rows adjacent to the rows subjected to the reset operation. The correction coefficient calculation unit 208 calculates the correction coefficient $A_{avg}(x, y)$ using the average value of the pixel output values of the pixels in the row subjected to the reset operation and the average value of the pixel output values of the plurality of pixels in rows adjacent to the row subjected to the reset operation.

In the example illustrated in FIG. 7A, the output value $D_{avg}(x, y)$ is determined by averaging the pixel output values in the y-th row of the driving line G(y) over a range from (x-5)th column to (x+5)th column. Alternatively, the output value $D_{avg}(y)$ may be given by averaging the pixel output values in the y-th row over all columns. In this case, the correction coefficient calculation unit 208 calculates the correction coefficient $A_{avg}(x, y)$ using the average value of the pixel output values of all pixels in the row subjected to the reset operation and the average value of the pixel output values of all pixels in respective rows adjacent to the row subjected to the reset operation.

Next, the artifact correction unit 209 calculates the product of the pixel output value D(x, y) in the x-th column and the y-th row and the correction coefficient $A_{avg}(x, y)$ according to equation (10) described below thereby determining the pixel output value D'(x, y) with the corrected artifact for the pixel in the x-th column and the y-th row.

$$D'(x,y)=D(x,y) \times A_{avg}(x,y) \quad (10)$$

Furthermore, the artifact correction unit 209 calculates the product of the pixel output value D(x, y+2) in the x-th column and the (y+2)th row and the correction coefficient $A_{avg}(x, y)$ according to equation (11) described below thereby determining the pixel output value D'(x, y+2) with the corrected artifact for the pixel in the x-th column and the (y+2)th row. Furthermore, the artifact correction unit 209 calculates the product of the pixel output value D(x, y+2×n−2) and the correction coefficient $A_{avg}(x, y)$ according to equation (12) described below thereby determining the pixel output value D'(x, y+2×n−2) with the corrected artifact. The artifact correction unit 209 calculates the pixel output value with the corrected artifact for pixels in the x-th column and the (y+2)th row, . . . , the x-th column and (y+2×n−2)th row according to equations similar to equation (11) or (12).

$$D'(x,y+2)=D(x,y+2) \times A_{avg}(x,y) \quad (11)$$

$$D'(x,y+2\times n-2)=D(x,y+2\times n-2) \times A_{avg}(x,y) \quad (12)$$

By employing the method described above, it becomes possible to correct artifacts without losing the image information. Note that the artifact correction method is for correcting an artifact caused by a loss of part of a charge generated by radiation exposure. In rows that are not subjected to the reset operation after the radiation exposure is started, no artifact occurs, and thus the artifact correction may not be performed. In a case where an image has a large difference in offset between even-numbered rows and odd-numbered rows, the artifact correction may be performed such that the offset difference is first corrected and then the artifact correction in step S309 illustrated in FIG. 3 is performed.

Third Embodiment

Figure 8A:
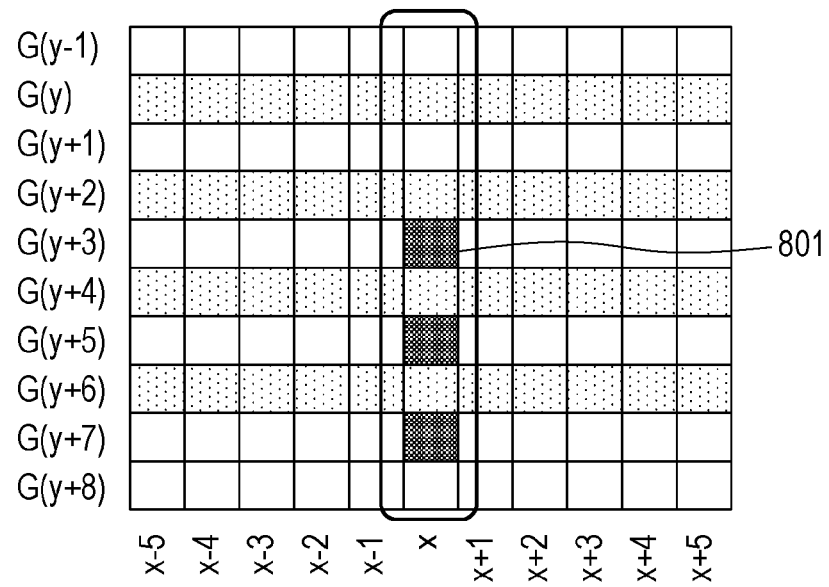
FIGS. 8A and 8B are diagrams illustrating a method of calculating a correction coefficient according to a third embodiment.
Figure 8B:
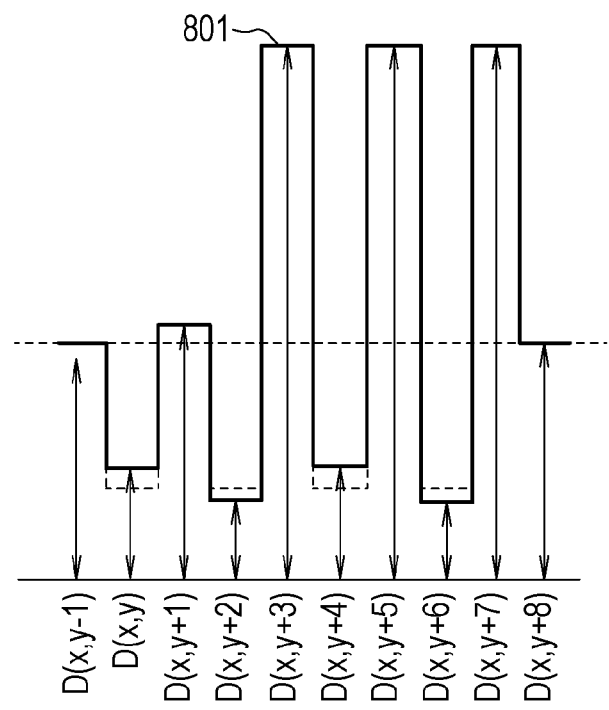

Referring to FIGS. 8A and 8B, a method of correcting artifact according to a third embodiment is described below. Note that FIGS. 8A and 8B respectively correspond to FIGS. 6A and 6B. In the following description of the third embodiment, focus is placed on differences from the first embodiment.

As illustrated in FIG. 8A, the present embodiment provides a method of correcting a correction coefficient for a case where the pixels of the two-dimensional sensor unit 204 include a saturated pixel 801. FIG. 8A is a conceptual diagram illustrating pixel output values for a case where saturation in output value occurs in pixels 801 at locations in the x-th column and (y+3)th row, x-th column and (y+5)th row, and x-th column and (y+7)th row. FIG. 8B is a conceptual diagram illustrating pixel output values in the x-th column. As illustrated in FIG. 8B, when saturation occurs in pixels 801 (hereinafter such a pixel also referred to as saturated pixels 801), if interpolation coefficients a(x, y+2), a(x, y+4) and a(x, y+6) are determined using pixel output values D(x, y+3), D(x, y+5), and D(x, y+7) of saturated pixels 801, then the result is that the interpolation coefficients a(x, y+2), a(x, y+4) and a(x, y+6) may have abnormal values. Furthermore, the correction coefficient A(x, y) used in the artifact correction may have an abnormal value.

Therefore, in a case where saturation occurs at some pixel 801 (saturated pixel) as in FIG. 8B, when the correction coefficient A(x, y) for use in the artifact correction is calculated according to equation (3) described above, an interpolation coefficient calculated using a pixel output value of the saturated pixel 801 is not used in the calculation of the correction coefficient A(x, y). Instead, the correction coefficient calculation unit 208 calculates the correction coefficient A(x, y) for use in the artifact correction using the average value of interpolation coefficients calculated using only pixel output values other than the pixel output value of the saturated pixel 801. This makes it possible to reduce the artifact correction error in the case where saturation occurs at some pixel 801.

In a case where saturation occurs in pixels 801 at locations illustrated in FIG. 8A, there is a high possibility that pixels at locations in the x-th column and (y+4)th row and x-th column and the (y+6)th row are also saturated pixels. Therefore, these pixels may be regarded as saturated pixels, and the artifact correction may be not performed for output values D'(x, y+4) and D'(x, y+6) of these pixels. The correction coefficient calculation unit 208 may seek coordinates of a saturated pixel using image information. Alternatively, the control computer 207 may additionally include a coordinate determining unit for identifying coordinates of a saturated pixel.

As described above, when there is a saturated pixel 801 in a plurality of pixels, the correction coefficient calculation unit 208 calculates the correction coefficient A(x, y) using pixel output values excluding a pixel output value of the saturated pixel 801. This makes it possible to reduce the artifact correction error in the case where saturation occurs at some pixel (saturated pixel 801).

Fourth Embodiment

Figure 9A:
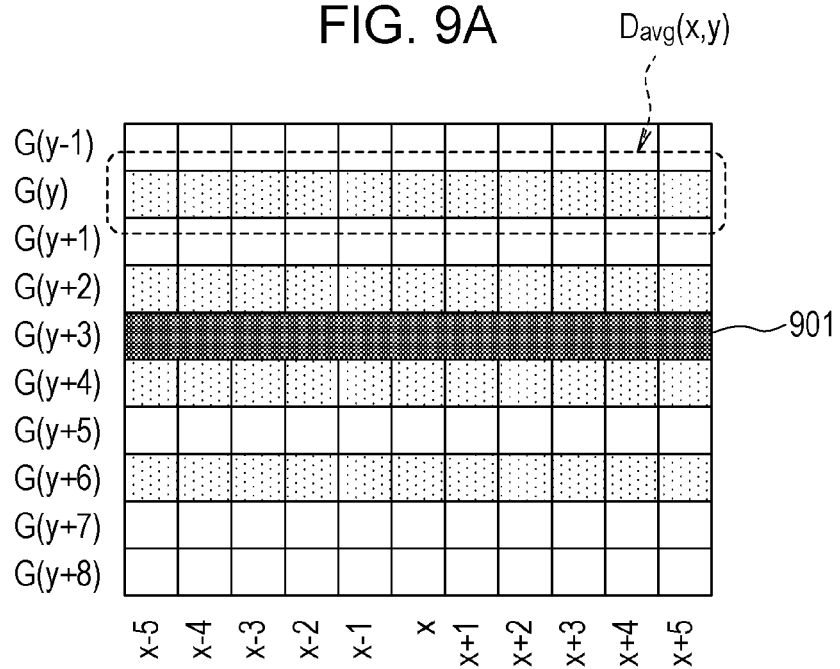
FIGS. 9A and 9B are diagrams illustrating a method of calculating a correction coefficient according to a fourth embodiment.
Figure 9B:
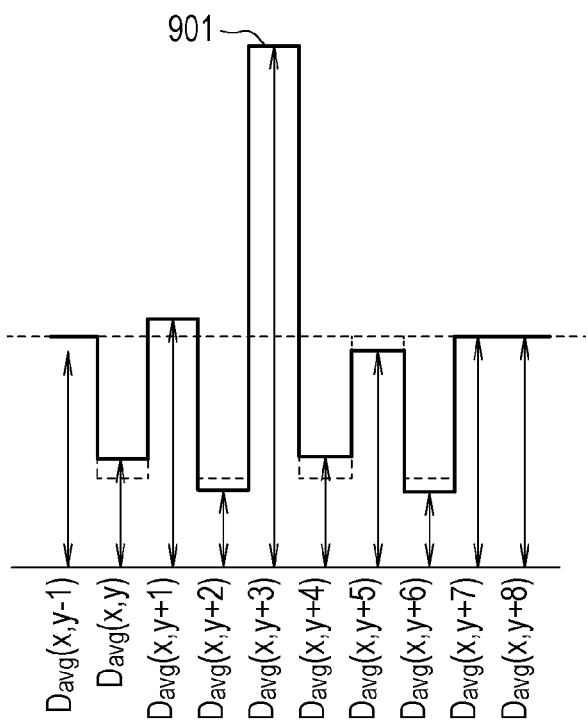

Referring to FIGS. 9A and 9B, a method of correcting artifact according to a fourth embodiment is described below. Note that FIGS. 9A and 9B respectively correspond to FIGS. 7A and 7B. In the following description of the fourth embodiment, focus is placed on differences from the second embodiment.

As shown in FIG. 9A, the fourth embodiment provides a method of correcting a correction coefficient for a case where the pixels of the two-dimensional sensor unit 204 include a line defect 901 in a row. FIG. 9B is a conceptual diagram illustrating pixel output values in a case where there is a line defect 901 in a (y+3)th row of a driving line G(y+3). FIG. 9B is a conceptual diagram illustrating output values $D_{avg}(x, y)$ obtained by averaging pixel output values in y-th row over an arbitrary range in the row direction as in the second embodiment described above.

As illustrated in FIG. 9B, saturation occurs in pixel output value of pixels in the line defect 901 in the (y+3)th row. In a case where there is a line defect such as a line defect 901 in the (y+3)th row, if interpolation coefficients $a_{avg}(x, y+2)$ and $a_{avg}(x, y+4)$ are calculated using pixel output values in the (y+3)th row, then the resultant interpolation coefficients have abnormal values. Furthermore, the correction coefficient $A_{avg}(x, y)$ used in the artifact correction has an abnormal value.

Therefore, in a case where there is a line defect in a row such as that illustrated in FIG. 9B, when the correction coefficient $A_{avg}(x, y)$ is calculated according to equation (9) described above, interpolation coefficients calculated using output values obtained by averaging pixel output values in the row of the line defect 901 over an arbitrary range in the row direction are not used in the calculation of the correction coefficient $A_{avg}(x, y)$. Instead, the correction coefficient calculation unit 208 calculates the correction coefficient $A_{avg}(x, y)$ for use in the artifact correction using the average value of interpolation coefficients calculated using output values obtained by averaging pixel output value in a row other the row of the line defect 901 over an arbitrary range in the row direction. This makes it possible to reduce the artifact correction error in the case where there is a line defect such as the line defect 901.

The correction coefficient calculation unit 208 may have information associated with defect coordinates provided when shipped, and the correction coefficient calculation unit 208 may recognize the coordinates of the line defect based on the provided information associated with the defect coordinates when the correction coefficient is calculated.

As described above, when there is a defect pixel in a plurality of pixels, the correction coefficient calculation unit 208 calculates the correction coefficient $A_{avg}(x, y)$ using pixel output values excluding a pixel output value of the defect pixel. This makes it possible to reduce the artifact correction error in the case where there is a defect pixel.

While the present invention has been described with reference to embodiments by way of example but not by limitation. It is to be understood that the invention is not limited to specific embodiments described above. On the contrary, the present invention may be embodied in various manners without departing from the spirit and scope of the invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-058521, filed Mar. 21, 2013, which is hereby incorporated by reference herein in its entirety.

What is claimed is:

1. A radiation image pickup system comprising:
a plurality of pixels arranged in the form of an array and each configured to convert radiation to an electric charge and output a pixel output value corresponding to the resultant electric charge;
a detection unit configured to detect a start of radiation exposure;
a drive control unit configured to, when the detection unit detects the start of radiation exposure, switch an operation on the plurality of pixels from a reset operation to a charge accumulation operation;
a correction coefficient calculation unit configured to calculate a correction coefficient using pixel output values output from the plurality of pixels; and
a correction unit configured to correct the pixel output values output from the plurality of pixels using the correction coefficient calculated by the correction coefficient calculation unit, wherein
the drive control unit repeatedly performs the reset operation to reset an electric charge caused by a dark current of the plurality of pixels until the detection unit detects the start of radiation exposure,
the reset operation is performed simultaneously for n rows that are not adjacent to each other where n is an integer equal to or greater than 2, and
the correction coefficient calculation unit calculates the correction coefficient using pixel output values of pixels belonging to a row subjected to the reset operation in a period from a time at which radiation exposure is started to a time at which the detection unit detects the start of radiation exposure and pixel output values of pixels belonging to a row adjacent to the row subjected to the reset operation.

2. The radiation image pickup system according to claim 1, wherein
the correction coefficient calculation unit calculates the correction coefficient using pixel output values of pixels belonging to n rows simultaneously subjected to the reset operation and pixel output values of pixels belonging to rows adjacent to the n rows simultaneously subjected to the reset operation.

3. The radiation image pickup system according to claim 1, wherein
the correction coefficient calculation unit calculates the correction coefficient using an average value of pixel output values of a plurality of pixels belonging to a row subjected to the reset operation and an average value of pixel output values of a plurality of pixels belonging to a row adjacent to the row subjected to the reset operation.

4. The radiation image pickup system according to claim 1, wherein
the correction coefficient calculation unit calculates the correction coefficient using an average value of pixel output values of all pixels belonging to a row subjected to the reset operation and an average value of pixel output values of all pixels belonging to a row adjacent to the row subjected to the reset operation.

5. The radiation image pickup system according to claim 1, wherein
in a case where the plurality of pixels include a saturated pixel in which a pixel output value is saturated, the correction coefficient calculation unit calculates the correction coefficient using pixel output values excluding a pixel output value of the saturated pixel.

6. The radiation image pickup system according to claim 1, wherein
in a case where the plurality of pixels include a defect pixel, the correction coefficient calculation unit calculates the correction coefficient using pixel output values excluding a pixel output value of the defect pixel.

7. The radiation image pickup system according to claim 1, further comprising a radiation generating apparatus configured to emit a radiation.

8. A radiation image pickup system comprising:
a plurality of pixels arranged in the form of an array and each configured to convert radiation to an electric charge and output a pixel output value corresponding to the resultant electric charge;
a detection unit configured to detect a start of radiation exposure;
a drive control unit configured to, when the detection unit detects the start of radiation exposure, switch an operation on the plurality of pixels from a reset operation to a charge accumulation operation;
a correction coefficient calculation unit configured to calculate a correction coefficient using pixel output values output from the plurality of pixels; and
a correction unit configured to correct the pixel output values output from the plurality of pixels using the correction coefficient calculated by the correction coefficient calculation unit,
wherein
the drive control unit repeatedly performs the reset operation to reset an electric charge caused by a dark current of the plurality of pixels until the detection unit detects the start of radiation exposure,
the reset operation is performed separately on a plurality of groups each including a plurality of rows that are not adjacent to each other, and
the correction coefficient calculation unit calculates the correction coefficient using pixel output values of pixels belonging to a row subjected to the reset operation in a period from a time at which radiation exposure is started to a time at which the detection unit detects the start of radiation exposure and pixel output values of pixels belonging to a row adjacent to the row subjected to the reset operation.

9. The radiation image pickup system according to claim 8, wherein
the reset operation is performed simultaneously for n rows that are not adjacent to each other where n is an integer equal to or greater than 2, and
the correction coefficient calculation unit calculates the correction coefficient using pixel output values of pixels belonging to n rows simultaneously subjected to the reset operation and pixel output values of pixels belonging to rows adjacent to the n rows simultaneously subjected to the reset operation.

10. The radiation image pickup system according to claim 8, wherein
the correction coefficient calculation unit calculates the correction coefficient using an average value of pixel output values of a plurality of pixels belonging to a row subjected to the reset operation and an average value of pixel output values of a plurality of pixels belonging to a row adjacent to the row subjected to the reset operation.

11. The radiation image pickup system according to claim 8, wherein
the correction coefficient calculation unit calculates the correction coefficient using an average value of pixel output values of all pixels belonging to a row subjected to the reset operation and an average value of pixel output values of all pixels belonging to a row adjacent to the row subjected to the reset operation.

12. The radiation image pickup system according to claim 8, wherein
in a case where the plurality of pixels includes a saturated pixel in which a pixel output value is saturated, the correction coefficient calculation unit calculates the correction coefficient using pixel output values excluding a pixel output value of the saturated pixel.

13. The radiation image pickup system according to claim 8, wherein
in a case where the plurality of pixels include a defect pixel, the correction coefficient calculation unit calculates the correction coefficient using pixel output values excluding a pixel output value of the defect pixel.

14. The radiation image pickup system according to claim 8,
further comprising a radiation generating apparatus configured to emit a radiation.

15. A computer comprising:
a correction coefficient calculation unit configured to calculate a correction coefficient using pixel output values of pixels output from a plurality of pixels after a charge accumulation operation and belonging to a row subjected to a reset operation in a period from a time at which radiation exposure is started to a time at which a detection unit detects a start of radiation exposure and pixel output values of pixels belonging to a row adjacent to the row subjected to the reset operation, wherein the reset operation to reset an electric charge caused by a dark current of the plurality of pixels arranged in the form of an array and each configured to convert radiation to an electric charge and output a pixel output value corresponding to the resultant electric charge is repeatedly performed separately on a plurality of groups each including a plurality of rows that are not adjacent to each other until the start of radiation exposure is detected by the detection unit configured to detect the start of radiation exposure, and an operation on the plurality of pixels is switched from the reset operation to the charge accumulation operation when the start of radiation exposure is detected by the detection unit; and
a correction unit configured to correct the pixel output values output from the plurality of pixels after the charge accumulation operation, using the correction coefficient calculated by the correction coefficient calculation unit.

16. The computer according to claim 15, wherein
the reset operation is performed simultaneously for n rows that are not adjacent to each other where n is an integer equal to or greater than 2, and
the correction coefficient calculation unit calculates the correction coefficient using pixel output values of pixels belonging to n rows simultaneously subjected to the reset operation and pixel output values of pixels belonging to rows adjacent to the n rows simultaneously subjected to the reset operation.

17. A non-transitory computer-readable medium storing a program for causing a computer to correct pixel output values output from a radiation image pickup apparatus including a plurality of pixels arranged in the form of an array and each configured to convert radiation to an electric charge and output a pixel output value corresponding to the resultant electric charge, a detection unit configured to detect a start of radiation exposure, and a drive control unit configured to, when the detection unit detects the start of radiation exposure, switch an operation on the plurality of pixels from a reset operation to a charge accumulation operation, the program causing the computer to execute:

calculating a correction coefficient using pixel output values of pixels output from a plurality of pixels after a charge accumulation operation and belonging to a row subjected to a reset operation in a period from a time at which radiation exposure is started to a time at which a detection unit detects a start of radiation exposure and pixel output values of pixels belonging to a row adjacent to the row subjected to the reset operation, wherein the reset operation to reset an electric charge caused by a dark current of the plurality of pixels arranged in the form of an array and each configured to convert radiation to an electric charge and output a pixel output value corresponding to the resultant electric charge is repeatedly performed separately on a plurality of groups each including a plurality of rows that are not adjacent to each other until the start of radiation exposure is detected by the detection unit configured to detect the start of radiation exposure, and an operation on the plurality of pixels is switched from the reset operation to the charge accumulation operation when the start of radiation exposure is detected by the detection unit; and correcting the pixel output values output from the plurality of pixels after the charge accumulation operation, using the correction coefficient calculated by the correction coefficient calculation unit.

18. The non-transitory computer-readable medium according to claim 17, wherein the reset operation is performed simultaneously for n rows that are not adjacent to each other where n is an integer equal to or greater than 2, and the correction coefficient is calculated using pixel output values of pixels belonging to n rows simultaneously subjected to the reset operation and pixel output values of pixels belonging to rows adjacent to the n rows simultaneously subjected to the reset operation.

\* \* \* \* \*